United States Patent [19]

Keil

[11] 4,011,189

[45] Mar. 8, 1977

[54] URETHANES MODIFIED WITH SILOXANES

[75] Inventor: Joseph W. Keil, Midland, Mich.

[73] Assignee: Dow Corning Corporation, Midland, Mich.

[22] Filed: Aug. 8, 1975

[21] Appl. No.: 602,933

[52] U.S. Cl. .......................... 260/33.6 UB; 252/12; 260/2.5 AH; 260/2.5 AY; 260/29.1 SB; 260/680 B; 260/683.1

[51] Int. Cl.² ...................... C08J 3/08; C08K 5/01; C08K 5/54

[58] Field of Search ............. 260/29.1 SB, 33.6 SB, 260/33.6 UB, 824 R, 2.5 AH, 2.5 AY, 683.1, 680 B; 252/12

[56] References Cited

UNITED STATES PATENTS

| | | | |
|---|---|---|---|
| 2,452,254 | 10/1948 | McGregor et al. | 260/29.1 SB |
| 2,551,638 | 5/1951 | Seger et al. | 260/683.1 |
| 3,508,945 | 4/1970 | Haemer et al. | 252/12 |
| 3,565,982 | 2/1971 | Day | 260/2.5 AY |
| 3,645,775 | 2/1972 | Schulze et al. | 260/2.5 AY |
| 3,709,954 | 1/1973 | Karol et al. | 260/680 B |
| 3,793,413 | 2/1974 | Hayes | 260/2.5 AY |

OTHER PUBLICATIONS

Encyclopedia of Pol. Sci. & Techn. (vol. 12) (Interscience)(N.Y.)(1970) pp. 558–559.
Modern Plastics Encyclopedia 1968 (McGraw-Hill) (N.Y.)(Sept. 1967) p. 588.

*Primary Examiner*—Donald E. Czaja
*Assistant Examiner*—H. H. Fletcher
*Attorney, Agent, or Firm*—Robert L. McKellar

[57] ABSTRACT

Urethane compositions are obtained by curing fluid polyurethane compositions containing incompatible fluids uniformly dispersed therein. Such uniform dispersions are prepared by including in the uncured urethane composition, a specific siloxane-organic copolymer dispersing agent, along with the incompatible fluids.

12 Claims, No Drawings

URETHANES MODIFIED WITH SILOXANES

Urethane resins are quite well-known materials and current patents and technical publications indicate that they are in high demand for a variety of uses.

Those properties which are most sought after by the users of urethane resins are toughness, flexibility and abrasion resistance. The reason that urethane resins are so popular is that they are very versatile materials. They can be tailor-made to fit a great number of applications. Even so, there are some applications that are hampered by the inability of the urethanes to completely fit the utility that they are being used in.

Further, there is a great deal of current interest in enhancing the abrasion resistance and slipperiness of the cured urethane coatings.

There have been many attempts and there are many ways to increase the slipperiness of cured urethane elastomers.

Conventional lubricating agents have been incorporated in urethane resins. These conventional lubricating materials are, for example, polydimethylsiloxanes, mineral oil and other petroleum-based lubricants. The major problem with the above conventional lubricating agents is that they are, for the most part, incompatible with the urethane resins to a large degree. Thus they tend to separate resulting in at least two nuisances, such as erratic lubrication and shelf instability which requires the user to reconstitute the mixture before each run.

On the other hand, recent developments in the art have included reactive internal lubricating agents which react into the urethane system and are bound thereby, thus eliminating the shelf stability problem and the erratic lubrication problem.

These reactive internal lubricating agents are limited, however, in that the reactive functionality must be a functionality that will react at nearly an equivalent rate as the functional groups of the reactive urethane resin in order to be bound into the cured urethane resin, i.e., a primary hydroxyl group. This shortcoming means that the lubricating agent has to be prepared from precursors which give functional groups such as primary hydroxyls in the terminating position of the polymer or, the polymer, when prepared from non-primary hydroxyl forming precursors, has to be treated to give the polymer a more highly reactive functional group such as a primary hydroxyl group.

Moreover, the reactive internal lubricating agents described above cannot be expediently used in urethane systems where there are no reactive groups, for example, those urethane systems where the urethane polymer is coated out from a solvent solution and just air dried to effect cure.

In addition to the lubricant properties of urethanes, there is also a great interest in modifying the electrical properties, impact resistance, water repellency, dielectric properties and the handling and processability of the urethane resins themselves.

The urethane systems contemplated by this invention are those commonly used and currently known in the art and include curable urethane resins, both the one-component and two-component systems; the air-dry systems which are essentially procured and dissolved in solvent and are coated out and allowed to air dry. Also included are thermoplastic and thermosetting urethane systems.

The cure of the curable urethane systems and the chemistry for preparing such resins is quite well known in the art and will not be unduly duplicated here.

Several references which discuss such matters and which can be of assistance to the practitioner are Golding, Polymers and Resins, Van Nostrand, 1959, pages 325 et. seq.; Saunders and Frisch, Polyurethanes, Chemistry and Technology, Part II, Interscience Publishers, 1964; Dombrow, Polyurethanes, Reinhold Publishing, 1957; Kassack, New Developments in Application Technology and Chemistry of Polyurethanes for Fabric Coating, Textile Chemist and Colorist, August, 1973/Vol. 5, No. 8, pages 22 et seq., among others.

Usually, the urethane resins are composed of low molecular weight isocyanate functional organic compounds such as toluene diisocyanate, diphenylmethane-4,4-diisocyanate, hexamethylene-1,6-diisocyanate, 1-isocyanato-3,3,5-trimethyl-5-isocyanatomethylcyclohexane and the like, and hydroxy functional polyethers or polyesters. The reactive macromolecule formed can either be a hydroxy functional or an isocyanato functional material. Generally, the materials are isocyanato functional. The reactive macromolecule can then either be air cured, i.e., through the influence of moisture in the air, or cured through reaction with a second reactive species, for example, a hydroxy functional organic compound such as 1,4-butanediol. This cure reaction and the formation of the reactive macromolecular precursor can be enhanced by the use of catalysts such as tin salts, for example, dibutyltindilaurate, but catalysts are not required. These materials are essentially thermoset polymers. It should be obvious that if the reactive macromolecule is hydroxy functional, then an isocyanato reactive material is necessary to cure it.

As indicated earlier, the urethane systems can be air dried as well as cured through reactive species. The air-dried materials are those that are formed from reactive macromolecular material, as indicated above, but have been reacted to the point that essentially no functional groups remain in the molecule. The basic isocyanate and polyether or polyester help determine whether the end product will be a product that can be air dried. These air-dried products are reacted and solubilized in a solvent. The materials are then coated or laid out on a substrate and upon evaporation of the solvent, the final product is formed. The materials can also be used neat. They are essentially thermoplastic in nature so that they can be milled or pressed to obtain products. It should be noted that the thermoset materials can be cured either at room temperature or at elevated temperatures depending on the type of basic ingredients in the reactive macromolecule, the type of reactive curing agent, the type of catalyst and the presence or absence of a catalyst.

In addition to the dispersing agent and the incompatible fluids discussed elsewhere in this specification, it is also within the scope of this invention to include other additives recognized in the industry as carrying out specific functions such as fillers, heat stability additives, antioxidants, pigments, light stabilization additives and the like. Both reinforcing and non-reinforcing fillers are contemplated herein.

The additives described in (b) below include any fluid materials which are incompatible with the urethane resins described above and which contribute some favorable property to the urethane resin or which enhances some particular property already inherent in the urethane resin.

Examples of such additives include siloxanes such as trimethylsilyl endblocked polydimethylsiloxane; trimethylsilyl endblocked trifluoropropylmethylsiloxane; mixtures of either of the above two siloxanes with a siloxane copolymer comprised of $SiO_2$ units and $R_3SiO_{1/2}$ units; liquid polyolefins; mineral oils and other petroleum oils and solvents. This list is not intended to be exhaustive but instead illustrates the variable additives that can be dispersed by component (c) described below.

To further illustrate and define the additives, it should be noted that trimethylsilyl endblocked polydimethylsiloxanes and the trimethylsilyl endblocked trifluoropropylmethylsiloxanes are essentially linear in structure and have viscosities at 25° C. of greater than 20 cs.

Mixtures of either of these two linear siloxanes and a siloxane copolymer as discussed above, only requires that the majority of the mixture be the linear siloxane. The siloxane copolymers composed of $SiO_2$ units and $R_3SiO_{1/2}$ units are resinous materials. The R radical can be any hydrocarbon radical containing from 1 to 6 carbon atoms. Thus, R can be an aliphatic radical such as the methyl, ethyl, propyl, butyl, isobutyl, pentyl, hexyl, vinyl, allyl, butenyl and hexenyl radicals; a cycloaliphatic radical such as the cyclohexyl and cyclohexenyl radicals; or R can be a phenyl radical. So far as is known at this time, the siloxane copolymers useful in this invention are those in which the ratio of the $SiO_2$ units to the $R_3SiO_{1/2}$ units is in the range of 1:0.4 to 1:1.2. The siloxane copolymer can contain minor amounts of $R_2SiO$ and $RSiO_{3/2}$ siloxane units wherein R is as defined above.

Examples of the liquid polyolefins useful herein are butadiene, polybutene and styrenebutadiene copolymers.

Mineral oils and other petroleum oils are common articles of trade and do not require further elucidation here.

The solvents contemplated as additives herein are not those solvents which would be mutual solvents for the three components of this invention. The solvents contemplated here are those solvents which do not solubilize the urethane resins. One such solvent, for example, is napthol mineral spirits which readily disperses in the urethane resins by the use of component (c).

The utility in such a solvent system is in the manufacture of microporous coatings where the solvent actually forms the pores in the reacting medium and after the coating cures, the solvent is evaporated leaving cellular coatings.

It is, therefore, an object of this invention to overcome the problems found in the use of prior art materials.

It is a further object of this invention to eliminate erratic lubrication problems in the use of urethane resins containing incompatible lubricating agents.

It is still another object of this invention to enhance the shelf stability of urethane resins containing incompatible lubricating agents.

It is yet another object of this invention to allow urethane resin users the versatility of using incompatible lubricating agents in both the curable and solvent dispersed, air-driable urethane resin systems.

It is a final object of this invention to bring to the urethane resin user enhanced lubricating properties through the use of the instant invention.

It has thus been found in accordance with this invention that when one of the specific silicone dispersing agents described below is used in urethane resin systems, it is possible to form dispersions of various fluid lubricants in the urethane resins and thereby enhance the properties of products made from the urethane resins.

Thus, in accordance with this invention, there is formed a homogeneous dispersion comprising (a) 55 to 99 parts by weight of a curable urethane composition; (b) 1 to 45 parts by weight of a fluid which is incompatible with the urethane composition, said fluid having a viscosity not exceeding 20,000,000 cs. at 25° C., wherein (a) + (b) is equal to 100 parts; (c) 1 to 20 weight percent based on the weight of (b) of a dispersing agent capable of maintaining (b) dispersed in (a), said dispersing agent being a siloxane-organic copolymer selected from the group consisting of (1) siloxane-organic copolymers consisting essentially of $SiO_2$ units, $(CH_3)_3SiO_{1/2}$ units and $D(CH_3)_2SiO_{1/2}$ units in which D is a polyoxyethylene polymer having a molecular weight of at least 500, or a polyoxyethylene-polyoxypropylene copolymer having a molecular weight of at least 2500 and the polyoxypropylene portion constitutes up to 50 mole percent of the organic portion of the copolymer, said D being attached to the silicon atom via a silicon-carbon bond, the ratio of the $SiO_2$ units to the total $(CH_3)_3SiO_{1/2}$ and $D(CH_3)_2SiO_{1/2}$ units being in the range of 1.0:0.4 to 1.0:1.2, (2) copolymers which are reaction products derived from heating a mixture of a siloxane consisting essentially of $SiO_2$ units and $(CH_3)_3SiO_{1/2}$ units in which the ratio of $SiO_2$ units to $(CH_3)_3SiO_{1/2}$ units is in the range of 1.0:0.4 to 1.0:1.2, and a hydroxylated polyoxyethylene polymer having a molecular weight of at least 500 or a hydroxylated polyoxyethylene-polyoxypropylene copolymer having a molecular weight of at least 2,500 and the polyoxypropylene constitutes up to 50 mole percent of the organic portion of the copolymer, (3) polydimethylsiloxane-organic copolymers in which the polydimethylsiloxane portion has a molecular weight of at least 1400 and the organic portion consists essentially of a polyoxyethylene polymer having a molecular weight of at least 500, or a polyoxyethylene-polyoxypropylene copolymer having a molecular weight of at least 1,000 and the polyoxypropylene constitutes up to 50 mole percent of the organic portion of the copolymer, said organic portion being attached to silicon atoms via silicon-carbon bonds, and (4) polydimethylsiloxane-organic copolymers which are reaction products produced by heating a mixture of hydroxylated polydimethylsiloxanes having a molecular weight of at least 1,400, and a hydroxylated polyoxyethylene polymer having a molecular weight of at least 500, or a hydroxylated polyoxyethylene-polyoxypropylene copolymer having a molecular weight of at least 1000 and the polyoxypropylene constitutes up to 50 mole percent of the organic portion of the copolymer.

One silicone dispersing agent useful herein is a siloxane copolymer consisting essentially of $SiO_2$ units, $(CH_3)_3SiO_{1/2}$ units and $D(CH_3)_2SiO_{1/2}$ units in which D is a polyoxyethylene polymer having a molecular weight of at least 500 or a polyoxyethylene-polyoxypropylene copolymer having a molecular weight of at least 2500 and the polyoxypropylene portion constitutes up to 50 mole percent of the copolymer, said D being attached to the silicon atom via a silicon-carbon bond, and the ratio of the $SiO_2$ units to the total $(CH_3)_3SiO_{1/2}$ and $D(CH_3)_2SiO_{1/2}$ units is in the range of 1:0.4 to 1:1.2. When the molecular weight of the polyoxyalkylene portion D falls below that specified above, the additive cannot be properly dispersed in the urethane resin. When D is polyoxypropylene, the additive cannot be properly dispersed either.

A second silicone dispersing agent useful herein is a siloxane copolymer reaction product derived from heating a mixture of a siloxane consisting essentially of $SiO_2$ units and $(CH_3)_3SiO_{1/2}$ units in which the ratio of the $SiO_2$ units to $(CH_3)_3SiO_{1/2}$ units is in the range of 1:0.4 to 1:1.2, and a hydroxylated polyoxyethylene polymer having a molecular weight of at least 500 or a hydroxylated polyoxyethylene-polyoxypropylene copolymer having a molecular weight of at least 2500 and the polyoxypropylene portion constitutes up to 50 mole percent of the copolymer. It is believed that these dispersing agents differ from those described immediately above, in that, the polyoxyalkylene portion is attached to the silicon atom via a silicon to oxygen to carbon bond instead of a direct silicon to carbon bond. It is theorized that the reaction upon heating takes place between residual silanol known to exist in the siloxane and the hydroxyl groups in the polyoxyalkylene. Formation of the reaction product is facilitated by the use of a catalyst known to promote the silanol carbinol condensation reaction, examples of such catalysts are bases such as potassium hydroxide and metal salts such as stannous octonoate. As noted above, molecular weight limitations are critical.

The third silicone dispersing agent useful in this invention is a polydimethylsiloxane-organic copolymer in which the polydimethylsiloxane portion has a molecular weight of at least 1400 and the organic portion consists essentially of a polyoxyethylene polymer having a molecular weight of at least 500 or a polyoxyethylene-polyoxypropylene copolymer having a molecular weight of at least 1000 and the polyoxypropylene portion constitutes no more than 50 mole percent of organic portion of the copolymer, said organic portion being attached to silicon atoms via silicon-carbon bonds.

The final silicone dispersing agent useful herein is a siloxane-organic copolymer which is the reaction product produced by heating a mixture of a hydroxylated polydimethylsiloxane having a molecular weight of at least 1,400 and a hydroxylated polyoxyethylene having a molecular weight of at least 500 or a hydroxylated polyoxyethylene-polyoxypropylene copolymer having a molecular weight of at least 1,000 and the polyoxypropylene constitutes up to 50 mole percent of the organic portion of the copolymer.

The comments with regard to the criticality of the molecular weight limitations and preparation techniques set forth with regard to the first two dispersing agents above is believed equally applicable to the last two respective dispersing agents of this invention. It should perhaps be noted at this point that polymers of this type are well known in the field of silicone chemistry as well as the means for preparing such polymers and hence no such details are given here as they are well known to the artisan.

So far as is known at this time, there is no critical order of mixing the three essential components of the composition of this invention, namely; the urethane resin, the additive and the silicone dispersing agent. However, once the three ingredients are brought together, a thorough mixing must take place in order that a uniform dispersion of the additive in the urethane resin with the aid of the silicone dispersing agent is achieved. Marketing and manufacturing procedures indicate that the best method for preparing the compositions is to first prepare a mixture of the additive and silicone dispersing agent which mixture can be stored for addition, at some future date, to the urethane resin, during the appropriate phase of manufacture.

In the final composition, the urethane resin should constitute from 55 to 99 parts by weight, preferably 65 to 85 parts; the additive should constitute 1 to 45 parts by weight, preferably 1 to 10 parts, and the silicone dispersing agent should constitute from 1 to 20 weight percent, preferably 1 to 5 percent, based on the weight of the additive.

Once the composition of this invention has been formed, it can be processed or used to manufacture articles in any of the known ways employed for urethane resins heretofore.

The products resulting from the compositions of this material are usually opaque, milky white or light brown in color.

Now in order that those skilled in the art may better understand how the present invention can be practiced, the following examples are given by way of illustration and not by way of limitation. All parts and percents referred to herein are by weight and all viscosities measured at 25° C. unless otherwise specified.

EXAMPLE 1

This example shows the ability of the inventive dispersing agent to effectively disperse a hydrocarbon solvent, which is incompatible, in a urethane composition.

The following materials were mixed on a propeller mixer until they were homogeneous.

50 pts. Stycast CPC-17 part A,
20 pts. Stycast CPC-17 part B,
5 pts. of a dispersing agent of this invention which consisted of 1 pt. of a siloxane composition consisting of $SiO_2$ units and $(CH_3)_3SiO_{1/2}$ units in the ratio of 1:0.4 to 1:1.2 reacted with 3 pts. of a 50/50 ethyleneoxidepropyleneoxide copolymer having a molecular weight of 6000, a viscosity of 5100 Saybolt Universal seconds at 100° F. and a OH value of 0.45 weight percent, and 4 pts. xylene, and
25 pts. of napthol mineral spirits.

The composition was allowed to gel at 50° C. for 24 hours. Note that heating is carried out in this example for test purposes and is not always necessary.

A small portion of the cured composition was cut out and dried in an oven to remove the solvent. The resulting product was a microporous foam of 0.79 g./cc. density which had uniform cells due to the excellent dispersability of the solvent throughout the urethane composition.

Note that Stycast CPC-17 is a two-part urethane potting compound which cures at room temperature and is manufactured by Emerson and Cummings of Canton, Mass.

For comparison purposes, the above formulation was repeated except the 5 parts of dispersing agent was not included. After curing, it was observed that all of the napthol mineral spirits had risen to the top and was layered.

EXAMPLE 2

This example illustrates the versatility of the dispersing agents of this invention in dispersing mineral oil in a urethane resin.

The formulation as used in Example 1, part 1, was used except 25 pts. of mineral oil, i.e., Shellflex 1,790, was used in the place of the 25 pts. of napthol mineral spirits of Example 1.

A second batch of mineral oil formulation was prepared that did not contain the dispersing agent.

The two formulations were mixed using a small spatula until they were homogeneous. They were then placed in a 100° C. oven to gel. After 1 hour, the formulation containing the dispersing agent was gelled, was uniform and homogeneous and had no separation while the second formulation had not gelled completely and was a mushy, oily material wherein the separated oil constituted approximately 10 percent of the total volume and mushy urethane gel constituted the other 90 percent of the total volume.

EXAMPLE 3

This example shows the versatility of the dispersing agents of this invention by dispersing a trimethylsilyl endblocked trifluoropropylmethylsiloxane in a urethane resin.

The following materials were hand mixed:
- 30.4 gms. of Conathane TU-75 part A,
- 7.6 gms. of Conathane TU-75 part B,
- 10.0 gms. of a trimethylsilyl endblocked trifluoropropylmethylsiloxane of 1000 cs. at 25° C., and
- 2.0 gms. of the dispersing agent of Example 1.

A second batch was prepared which excluded the dispersing agent. Note that Conathane TU-75 is a two-component, room temperature vulcanizing urethane resin manufactured by Conap, Inc. It is a clear liquid having a specific gravity of 1.06 at 25° C., a viscosity of 5,000 cps. at 25° C. and an NCO of 5.5%.

The materials were allowed to gel overnight at room temperature. The first formulation in this example was uniform, homogeneous and white in color. The second formulation of this example was separated whereupon the trifluoropropylmethylsiloxane was all collected on the bottom and the urethane was the top layer. Since the second formulation had separated, it was not further cured but the inventive composition was further cured to give a homogeneous, white rubber after curing 16 hours at 70° C.

EXAMPLE 4

This example illustrates the lubricating properties of the cured urethanes containing emulsified lubricants. This example also illustrates that the physical properties of the cured, lubricant-containing urethanes have not been significantly altered.

A dispersing agent was prepared by mixing together 1 part of a resinous copolymer containing 3 to 4 weight percent of hydroxyl and wherein the ratio of $SiO_2$ units to $(CH_3)_2SiO_{1/2}$ units was in the range of 1.0:0.4 to 1.0:1.2, 3 parts of a polyoxyalkylene glycol which is a 50/50 mole ratio of ethylene oxide and propylene oxide having a viscosity of 5,100 Saybolt Universal seconds at 100° F., specific gravity of 1.063 at 68/68° F. and a hydroxyl value of 0.45 weight percent; 4 parts of reagent grade xylene and .02 parts of a tin octanoate catalyst. The mixture was placed in a round bottomed 3-necked flask and equipped for reflux. The reflux was carried out for several hours and the by-produced water was collected. The result was a copolymer of the resinous copolymer and the polyoxyalkylene copolymer.

The dispersing agent was then used in the following manner:

Formulation A was a control containing no dispersing agent or lubricant.

There was mixed by hand the following formulation, designated as B. 100 parts by weight of Cyanaprene A-9, a urethane based polymer manufactured by the American Cyanamid Company, Bound Brook, New Jersey. The material is a viscous, honey colored liquid having an NCO content of approximately 4.2 weight percent, a specific gravity of 1.21 at 70° C., and a viscosity of 3,300 to 3,400 cps. at 70° C. (Brookfield); to this was added 8.0 parts by weight of Isonol-93, a curing agent, which is a low molecular weight, highly reactive triol manufactured by the Upjohn Co., Laporte, Tex., and which has a hydroxyl number of 620, a hydroxyl value of 18.8 weight percent and a viscosity of 750 cps. at 25° C., 4.0 parts by weight of the dispersing agent prepared above and a siloxane lubricant wherein there is present 1 part of dispersing agent and 5 parts of the siloxane lubricant. The siloxane lubricant was a trimethylsiloxy endblocked polydimethylsiloxane fluid having a viscosity of 60,000 cs. at 25° C. The materials were cured at 100° C. for 1 hour and then post-cured at 100° C. overnight.

Strips were cut in order to test the abrasion resistance of the material. Physical properties were also taken on additional strips.

The abrasion resistance was determined on an AATCC crockmeter. The apparatus consists of a suspended friction free table to which a 3" by 6" metal panel is attached. The urethane piece to be tested is glued to the face of the steel panel before it is inserted in the machine. The machined end of a 5/8" diameter by 1½ rod rubs back and forth at a predetermined load over the urethane piece in 4" strokes for a controlled number of cycles. The coefficient of friction ($\mu$) and wear scar are measured.

The arm is loaded with a 4 lb. load (13.6 p.s.i. force) and the speed is set at 60 cycles/minute.

There were also prepared additional formulations wherein the Cyanaprene A-9 of formulation B was replaced with 100 parts of Adiprene L-100 and the Isonol-93 was replaced by 12 parts of 4,4'-methylene-bis(2-chloroaniline). Adiprene L-100 is an isocyanate endblocked polytetramethylene reacted with a polyalkylene ether glycol and manufactured by the Dupont Elastomer Chemicals Department. In its raw polymer form, it is a liquid of honey-like color and consistency. This formulation was designated D.

A fourth material was prepared wherein the formulation was the same as D except no dispersing agent or lubricant was added. This was designated C.

A formulation designated F containing 100 parts of Cyanaprene A-9 and 12.5 parts of 4,4'-methylenebis(2-chloroaniline) was prepared and a formulation designated E was the same as F except it contained 4 parts of the dispersing agent and lubricant of Example 4A.

The results on lubricating properties are in Table I.

The results on physical properties of the above samples are shown in Table II.

TABLE I

| Material | Time (min.) | μ | Wear Scar |
|---|---|---|---|
| A | 0 | 1.00 | |
|  | 5 | 1.50 | Very noticeable* |
| B | 0 | 0.80 | |
|  | 35 | 0.65 | |
|  | 90 | 0.50 | |
|  | 120 | 0.40 | None |
| C | 0 | 1.00 | |
|  | 5 | 1.35 | Very noticeable* |
| D | 0 | 0.15 | |
|  | 80 | 0.20 | |
|  | 100 | 0.15 | |
|  | 120 | 0.175 | None |
| E | 0 | 0.375 | |
|  | 10 | 0.875 | |
|  | 15 | 1.100 | Very noticeable |
| F | 0 | .15 | |
|  | 15 | .175 | |
|  | 45 | .125 | |
|  | 90 | .125 | None |

*Sample vibrating and jumping.

TABLE II

| Material | (mils) Thickness | Tensile psi | Kg/cm² | Elongation(%) | Modulus at % Elongation (p.s.i.)/(Kg./cm²) 100 | 200 | 300 |
|---|---|---|---|---|---|---|---|
| A | .79 | 2294 | 161 | 440 | 253/17.7 | 395/27.6 | 587/44.1 |
|  |  | 3920 | 274 | 460 |  |  |  |
|  |  | 2314 | 161 | 480 |  |  |  |
| B | .80 | 1850 | 130 | 430 | 235/16.4 | 360/25.4 | 545/38.1 |
|  |  | 2285 | 160 | 440 |  |  |  |
|  |  | 2590 | 181 | 430 |  |  |  |
| C | .81 | 3150 | 220 | 610 | 840/58.8 | 1037/72.6 | 1249/87.4 |
|  |  | 3496 | 245 | 620 |  |  |  |
|  |  | 3407 | 238 | 610 |  |  |  |
| D | .80 | 2900 | 206 | 550 | 740/51.8 | 945/66.1 | 1175/82.2 |
|  |  | 3250 | 227 | 580 |  |  |  |
|  |  | 3200 | 224 | 570 |  |  |  |
| E | .82 | 6049 | 423 | 590 | 907/63.5 | 1190/83.3 | 1688/118.3 |
|  |  | 7141 | 500 | 590 |  |  |  |
|  |  | 7005 | 490 | 580 |  |  |  |
| F | .80 | 5000 | 350 | 570 | 780/54.6 | 1050/73.5 | 1520/106.5 |
|  |  | 5500 | 385 | 540 |  |  |  |
|  |  | 4900 | 343 | 530 |  |  |  |

EXAMPLE 5

When the dispersing agent of Example 4 was substituted by a dispersing agent which was similar to the dispersing agent of Example 4 but which had an Si-C bond instead of an Si-O-C bond, there were obtained equivalent results.

EXAMPLE 6

When the dispersing agent of Example 4 was substituted by a dispersing agent which was a polydimethylsiloxane-organic copolymer wherein the polydimethylsiloxane portion has a molecular weight of at least 1,400 and the organic portion consists essentially of polyoxyethylene having a molecular weight of at least 500 and the organic portion is attached to silicon atoms via silicon carbon bonds, then equivalent results are obtained.

EXAMPLE 7

When the dispersing agent of Example 4 was substituted by a dispersing agent which was a polydimethylsiloxane-organic copolymer produced by heating a mixture of hydroxylated polydimethylsiloxanes having a molecular weight of at least 1400 and a hydroxylated polyoxyethylene polymer having a molecular weight of at least 500, or a hydroxylated polyoxyethylenepolyoxypropylene copolymer having a molecular weight of at least 1,000, then equivalent results are obtained.

That which is claimed is:
1. A homogeneous polymeric dispersion comprising
   a. 55 to 99 parts by weight of a curable urethane composition;
   b. 1 to 45 parts by weight of a fluid which is incompatible with the urethane composition, said fluid having a viscosity not exceeding 20,000,000 cs. at 25° C., wherein (a) + (b) is equal to 100 parts,
   c. 1 to 20 weight percent based on the weight of (b) of a dispersing agent capable of maintaining (b) dispersed in (a), said dispersing agent being a siloxane-organic copolymer selected from the group consisting of
      1. siloxane-organic copolymers consisting essentially of $SiO_2$ units, $(CH_3)_3SiO_{1/2}$ units and $D(CH_3)_2SiO_{1/2}$ units in which D is a polyoxyethylene polymer having a molecular weight of at least 500, or a polyoxyethylenepolyoxypropylene copolymer having a molecular weight of at least 2,500 and the polyoxypropylene portion constitutes up to 50 mole percent of the organic portion of the copolymer, said D being attached to the silicon atom via a silicon-carbon bond, the ratio of the $SiO_2$ units to the total $(CH_3)_3SiO_{1/2}$ and $D(CH_3)_2SiO_{1/2}$ units being in the range of 1.0:0.4 to 1.0:1.2,
      2. copolymers which are reaction products derived from heating a mixture of a siloxane consisting essentially of $SiO_2$ units and $(CH_3)_3SiO_{1/2}$ units in which the ratio of $SiO_2$ units to $(CH_3)_3SiO_{1/2}$ units is in the range of 1.0:0.4 to 1.0:1.2, and a hydroxylated polyoxyethylene polymer having a molecular weight of at least 500 or a hydroxylated polyoxyethylene-polyoxypropylene copolymer having a molecular weight of at least 2,500 and the polyoxypropylene constitutes up to 50 moles percent of the organic portion of the copolymer,
      3. polydimethylsiloxane-organic copolymers in which the polydimethylsiloxane portion has a molecular weight of at least 1400 and the organic portion consists essentially of a polyoxyethylene polymer having a molecular weight of at least 500, or a polyoxyethylene-polyoxypropylene copolymer having a molecular weight of at least 1,000 and the polyoxypropylene constitutes up to 50 mole percent of the organic portion of the copolymer, said organic portion being attached to silicon atoms via silicon-carbon bonds, and
4. polydimethylsiloxane-organic copolymers which are reaction products produced by heating a mixture of hydroxylated polydimethylsiloxanes having a molecular weight of at least 1400, and a hydroxylated polyoxyethylene polymer having a molecular weight of at least 500, or a hydroxylated polyoxyethylene-polyoxypropylene copolymer having a molecular weight of at least 1,000 and the polyoxypropylene constitutes up to 50 mole percent of the organic portion of the copolymer.

2. A dispersion as claimed in claim 1 wherein (a) is from 65 to 85 parts by weight, (b) is from 1 to 10 parts by weight, and (c) is from 1 to 5 weight percent based on the weight of (b).

3. A dispersion as claimed in claim 2 wherein (b) is a fluid organopolysiloxane.

4. A dispersion as claimed in claim 3 wherein (b) is a trimethylsilyl-endblocked polydimethylsiloxane.

5. A dispersion as claimed in claim 3 wherein (b) is a trimethylsilyl endblocked polytrifluoropropylmethylsiloxane.

6. A dispersion as claimed in claim 3 wherein (b) is a trimethylsilyl-endblocked polydimethylsiloxane and (c) is copolymer (2).

7. A dispersion as claimed in claim 3 wherein (b) is a trimethylsilyl-endblocked trifluoropropylmethylsiloxane and (c) is copolymer (2).

8. A dispersion as claimed in claim 2 wherein there is also a filler present.

9. A dispersion as claimed in claim 2 wherein (b) is mineral oil.

10. A dispersion as claimed in claim 2 wherein (b) is liquid polyolefin.

11. A dispersion as claimed in claim 10 wherein (b) is selected from the group consisting of (i) polybutadiene; (ii) polybutene and (iii) styrene-butadiene copolymer.

12. A dispersion as claimed in claim 2 wherein (b) is naphthol mineral spirits.

* * * * *

UNITED STATES PATENT AND TRADEMARK OFFICE
CERTIFICATE OF CORRECTION

PATENT NO. : 4,011,189
DATED : March 8, 1977
INVENTOR(S) : JOSEPH W. KEIL

It is certified that error appears in the above-identified patent and that said Letters Patent are hereby corrected as shown below:

Column 7, line 29, after the word "Conathane" insert --®--.

Column 7, line 30, after the word "Conathane" insert --®--.

Column 7, line 35, after the word "Conathane" insert --®--.

Column 8, line 11, after "A-9" insert --®--.

Column 8, line 47, after "A-9" insert --®--.

Column 8, line 61, after "A-9" insert --®--.

Column 10, line 18, "polyoxyethylenepolyoxypropylene"

should read --polyoxyethylene-polyoxypropylene--.

Signed and Sealed this

First Day of May 1979

[SEAL]

Attest:

RUTH C. MASON
Attesting Officer

DONALD W. BANNER
Commissioner of Patents and Trademarks